UNITED STATES PATENT OFFICE.

LORENZ ACH, OF MANNHEIM, AND ALBERT ROTHMANN, OF HEIDELBERG, GERMANY, ASSIGNORS TO FARBWERKE VORM. MEISTER LUCIUS & BRUENING, OF HÖCHST-ON-THE-MAIN, GERMANY, A FIRM.

ART OF PREPARING AMINO-ARSENOBENZENES.

1,156,044.  Specification of Letters Patent.  Patented Oct. 12, 1915.

No Drawing.  Application filed March 24, 1913.  Serial No. 756,554.

*To all whom it may concern:*

Be it known that we, LORENZ ACH and ALBERT ROTHMANN, citizens of the German Empire, residing at Mannheim and Heidelberg, Germany, respectively, have invented certain new and useful Improvements in the Art of Preparing Amino-Arsenobenzenes; and we do hereby declare the following to be a full, clear, and exact description of the invention, such as will enable others skilled in the art to which it appertains to make and use the same.

This invention relates to the art of preparing amino-arseno benzenes with particular reference to the manufacture of the new compound, hexamino-arseno benzene, the object being to obtain a pharmacal compound which combines germicide action with relatively low toxicity.

We have found that if 4-amino-3.5-dinitro benzene-arsinic acid, a compound which has been described in *Berichte der Deutschen Chemischen Gesellschaft* vol. 45 (1912) page 56, is acted on with a reducing agent, a new chemical compound, 3.4.5.3′.4′.5′-hexamino-arsenobenzene, having valuable therapeutic properties is obtained. The reducing agent for this purpose, we have found, may be acid, for example, tin, or stannous chlorid combined with hydrochloric acid. or powder of zinc in conjunction with hydrochloric acid, or it may be the non-acid compound sodium hydrosulfite.

Since hexamino-arsenobenzene contains the amino groups in the ortho-position and in the meta-position, and it is well-known that ortho-phenylene diamin and meta-phenylene diamin are extremely poisonous substances, it was to be supposed that the present new arseno derivative would also possess a similar high toxic action and would, therefore, not be adapted for medicinal use. We have been surprised to find, however, that such is not the case.

The following examples, embodying what we consider the preferred manner of carrying out the process comprised in our invention are given to fully disclose the same. The proportions given are by weight, unless otherwise stated.

Example 1: 6.1 parts of 3.5-dinitro-4-aminobenzene-1-arsinic acid are suspended in 200 parts of concentrated hydrochloric acid and thereupon gradually mixed with 14 parts of pulverized tin while concurrently well stirring the mixture as it proceeds. The product of reduction begins to separate immediately. After all the tin has been added, the reaction is hastened by heating the whole over an open flame. The reducing action is at an end when a sample of the product dissolves in water to form a clear solution. The whole is then allowed to cool and the precipitate, which is a double salt of tin, is separated from the mother-liquor by decantation, siphoning or otherwise, and is then dissolved in water, sufficient soda-lye (NaOH) being then added to the solution in excess to maintain the tin-oxids in solution. Thereby the new basic compound is thrown down and is separated by filtration. After having been thoroughly washed, it is dissolved in double-normal hydrochloric acid solution. By thereupon adding to this solution an equal volume of concentrated hydrochloric acid, the chlorid of the new compound, the hexamino-arsenobenzene is precipitated. The precipitate is purified by washing it successively with hexanormal hydrochloric acid, alcohol, and ether.

Example 2: 6.1 parts of the dinitro-amino-benzene-arsinic acid are gradually added while well stirring the whole, to a solution of 38 parts of crystalline stannous chlorid in 100 parts of concentrated hydrochloric acid. Again, as stated under Example 1, the double salt of tin of the new compound is obtained as the product of the reduction. The free new basic compound is then obtained by decomposing the said double salt with alkali, whereupon the chlorid of the said new basic compound is prepared as explained under Example 1.

Example 3: 6.1 parts of the dinitro-amino-benzene-arsinic acid of the above examples are suspended in 200 parts of a mixture consisting of equal parts of alcohol and concentrated hydrochloric acid and to this bath are gradually added 30 parts of zinc dust while well stirring. The yellow nitro compound is thereby converted into a flaky dark substance which gradually goes into solution. After all the zinc has been added, the whole is heated over an open flame until a sample of the whole yields a yellowish-green precipitate on adding concentrated hydrochloric acid. Thereupon a further quantity of 100 parts of concentrated hydrochloric acid is added to the liquid after the same has undergone filtration. The whole is then cooled and the precipitated product of the reduction in the form of a double salt of zinc is separated by siphoning or otherwise. It is then dissolved in water, and dilute soda-lye is added to the solution, whereby the new product, the hexamino-arsenobenzene, is obtained which is then obtained as a chlorid by treating it as in the preceding examples.

In each of the above examples the reducing agent employed is acid and leads to the formation of the corresponding metal double-salt of the new amino-arseno compound. Instead of an acid reducing agent we find that sodium hydrosulfite may be employed to reduce the starting material, but in this case the immediate product of the reaction will be an intermediate product containing sulfur which has the remarkable property of forming a clear solution with alkali, so that apparently the reduction has not led directly to the desired hexamino-arseno compound. However, as has been further found, the salts of the hexamino-arseno compound may be obtained from the sulfur-containing intermediate product by treating the same with an acid and preferably heating, whereby sulfurous acid is split off. The process in detail is as follows:

Example 4: 3 parts of dinitro-amino-benzene-arsinic acid, as above, are dissolved in 60 parts of water to which are added 5.4 parts of double-normal soda-lye (NaOH), and the whole is then gradually mixed with 35 parts of sodium hydrosulfite while vigorously stirring. The solution thereby becomes discolored, and soon a yellow flaky precipitate separates out of the menstruum. This phase of the process is soon terminated. Thereupon the precipitate is separated by siphoning, decantation or otherwise and washed with some water and it is then suspended in 50 parts of water which has been acidulated with 20 parts of tetra-normal hydrochloric acid. The same is then heated gently, whereby it is gradually brought into solution, with escape of sulfurous acid. This solution is then filtered and an equal volume of concentrated hydrochloric acid added, whereupon the chlorid of the new compound separates out.

The new compound, hexamino-arseno-benzene, is a base which is very unstable in a free state, and which rapidly assumes a dark color on being exposed to the air. It is readily soluble in dilute acid, but insoluble in the usual organic solvents. The chlorid of the new compound is obtained in the form of a yellowish-green powder readily soluble in water and dilute acids, but insoluble in alkalis.

The new compound whether in an uncombined state or in the form of a chlorid is a powerful germicide having a particularly strong bactericidal action on spirilla.

What we claim and desire to secure by Letters Patent is:

1. In the art of producing amino-arseno-benzenes, the sub-process which consists in treating 3.5-dinitro-4-aminobenzene-1-arsinic acid with a reducing agent.

2. In the art of producing amino-arseno-benzenes, the sub-process which consists in treating 3.5-dinitro-4-aminobenzene-1-arsinic acid, with a reducing agent and then treating with alkaline substance to separate the resultant basic compound.

3. In the art of producing amino-arseno-benzenes, the sub-process which consists in treating 3.5-dinitro-4-aminobenzene-1-arsinic acid with an acid reducing agent.

4. In the art of producing amino-arseno-benzenes, the sub-process which consists in treating 3.5-dinitro-4-aminobenzene-1-arsinic acid with an acid reducing agent and then treating the whole with an alkaline substance to separate the resultant basic compound.

5. The process which consists in treating 3.51dinitro-4-aminobenzene-1-arsinic acid, with a reducing agent, then treating with alkaline substance to separate the resultant basic compound, and then treating the latter with acid.

6. The process which consists in treating 3.5-dinitro-4-aminobenzene-1-arsinic acid with an acid reducing agent, then treating the whole with an alkaline substance to separate the resultant basic compound, and then treating the latter with acid.

7. As a new composition of matter, a chemical compound comprising the base 3.4.5.3'.4'.5'-hexamino-arsenobenzene which has the property of being readily soluble in dilute acids and insoluble in alkaline solutions, and which has strong bactericidal action.

8. As a new composition of matter, a chemical compound consisting in the base 3.4.5.3'.4'.5'-hexamino-arsenobenzene, and having the property of being readily soluble in dilute acids, insoluble in alkaline solutions and in the usual organic solvents, of rapidly becoming discolored when exposed to the atmosphere, and having strong bactericidal action.

In testimony whereof we hereunto affix our signatures in the presence of two witnesses.

LORENZ ACH.
ALBERT ROTHMANN.

Witnesses:
 JOSEPH PFEIFFER,
 GARRY TILLY.